W. U. GRIFFITHS.
MEANS FOR CLOSING VALVES.
APPLICATION FILED JAN. 26, 1911.
1,048,825.
Patented Dec. 31, 1912.
FIG. 1.
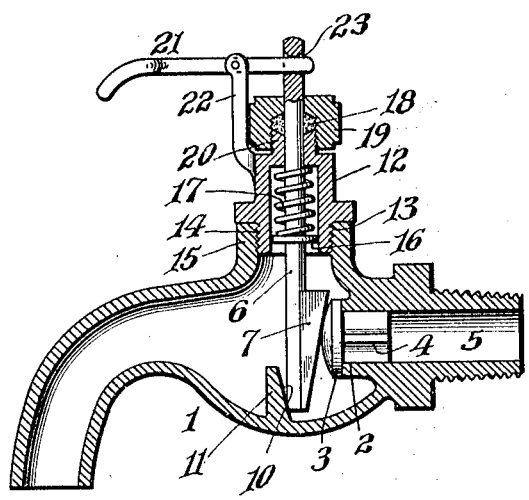
FIG. 3.
FIG. 2.
FIG. 4.
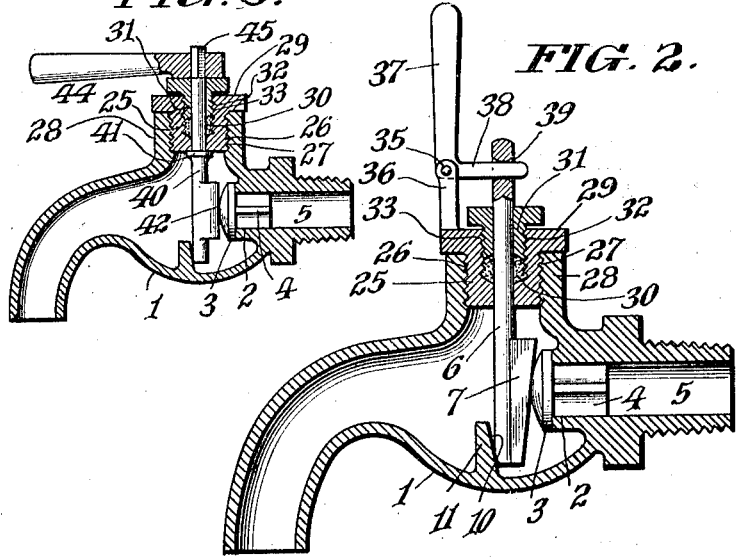
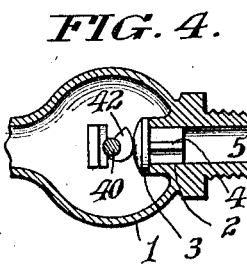
WITNESSES
Carrie E. Kleinfelder.
Daniel Webster, Jr.
INVENTOR
William U. Griffiths
BY Cyrus N. Anderson
ATTORNEY

UNITED STATES PATENT OFFICE.

WILLIAM U. GRIFFITHS, OF PHILADELPHIA, PENNSYLVANIA.

MEANS FOR CLOSING VALVES.

1,048,825.  Specification of Letters Patent. Patented Dec. 31, 1912.

Application filed January 26, 1911. Serial No. 604,795.

*To all whom it may concern:*

Be it known that I, WILLIAM U. GRIFFITHS, a citizen of the United States, residing in the city and county of Philadelphia, State of Pennsylvania, have invented certain new and useful Improvements in Means for Closing Valves, of which the following is a specification.

My invention relates to improvements in means for closing the valves by means of which ports or openings through which water or similar fluid is adapted to escape are opened and closed, and it has for one of its objects to provide means whereby such valves may be readily and quickly closed and retained in a tightly closed position.

A further object of my invention is to provide means whereby such valves after having been opened to permit the efflux of water or other similar fluid are automatically closed by a constantly acting device.

A still further object is to provide such a construction which is simple and effective in operation and which may be economically produced.

In order that my invention may be more clearly and readily understood, reference may be had to the accompanying drawings in which I have illustrated convenient embodiments thereof as applied to a spigot, but it will be understood that it may be employed in connection with other forms of construction than that shown.

In the drawings:—Figure 1 is a longitudinal sectional view of a spigot showing means for closing the same embodying my invention; Fig. 2 is a similar view showing a modified construction of means for that purpose; Fig. 3 is a similar view showing another modified construction; and Fig. 4 is a transverse section at right angles to the view in Fig. 3 and showing a detail of the construction.

Referring to the drawings:—1 designates a spigot having a port 2 which is adapted to be closed by a valve 3. The valve is provided with a stem 4 which is seated or positioned in the passageway or tube 5 adjacent to the port 2.

6 designates a rod which extends transversely of and a short distance from the valve 3 and is provided with an inclined cam 7 which is adapted to engage the valve 3 and occasion the closing thereof when moved in a direction to bring the thicker portion of the said cam 7 into contact with the valve. In the construction shown the thicker portion of the cam is brought into contact with the valve by moving the rod 6 downwardly. It will, of course, be understood that the cam may be differently arranged so that the rod in order to cause the cam to close the valve would have to be moved in the opposite direction. The lower end of the rod 6 is adapted to engage the inclined surface 10 of a projection 11 formed in the spigot 1 so that as the rod 6 is moved downwardly the said inclined surface 10 causes a slight movement of the cam 7 toward the valve so as to insure the tight closing of the valve.

Referring to Fig. 1, the rod 6 is supported and guided in a hollow plug 12 having external screw threads at 13 which engage the internal screw threads 14 of a hollow projection 15 formed on the spigot 1. The rod 6 in Fig. 1 is provided with a rest or abutment 16 against which one end of a coiled spring 17 is seated, the said spring being coiled around the said rod. The said spring is located in the hollow space within the plug 12 and its upper end is seated against an abutment at the upper end of the said space. The pressure occasioned by the spring 17 in its endeavor to expand holds the rod 6 together with the cam 7 in its lowermost position so as to hold the valve tightly closed. The rod passes through a packing 18 which is held in place by the nut 19 having screw-threaded connection with a boss 20 upon the upper end of the plug 12.

21 designates a lever pivoted intermediate its ends upon a bracket 22 upon the plug 12 and one end of which engages an opening 23 in the upper end of the rod 6. When it is desired to permit the valve 3 to be opened by the pressure of water thereagainst from the rear, the outer end of the said lever 21 is depressed so as to raise the rod 6 and its cam 7; thus the thinner or lower portion of the cam 7 is brought into position opposite the valve 3 whereby the latter may be moved outwardly by the pressure of the water or other fluid so as to permit the passage thereof from the port 2 and through the spigot 1.

Referring to Fig. 2, 25 designates a plug having external screw threads 26 which engage the internal screw threads 27 upon a hollow projection 28 upon the spigot 1. The upper end of the said plug is flanged, as indicated at 29, which flange may rest upon the upper edge or end of the projection 28. 30 designates packing material inside the plug 25 which is held in place by means of a gland 31 having screw threads 32 which engage the interior screw threads 33 of the plug 25. The rod 6 passes through and is guided by the plug 25, packing 30, and gland 31. The rod 6 and the cam 7 carried thereon are operated by means of a bell crank lever pivoted at 35 to a bracket 36. The portion 37 of said lever constitutes a hand piece while the portion 38 engages an opening 39 in the upper end of the rod 6. By moving the hand portion 37 to the left the portion 38 is raised so as to cause upward movement of the rod 6 and the cam 7 carried thereby so as to permit the pressure of the water or other fluid in the rear of the valve 3 to cause the opening thereof and to permit the escape of the water through the spigot 1.

Referring to Figs. 3 and 4, the parts 1 to 5 and 25 to 33 are identical with the correspondingly numbered parts in Fig. 2 of the drawings. In said Figs. 3 and 4, 40 designates a rod, the lower end of which is adapted to rest against the projection 11 and which is supported by means of the plug 25 and gland 31. The rod is prevented from moving upwardly by means of a flange 41 which engages the lower end of the plug 25. The rod 40 is provided with a cam 42 the operating surface of which is circular and extends around the axis of the rod 40 in the manner indicated in Fig. 4 of the drawings. As illustrated, the cam is of considerable length but it may be shortened or lengthened as desired, the only requisite being that it be of sufficient length to properly engage the valve 3 and actuate the same to close it. The cam supporting rod 40 is operated by means of a handle 44 which engages a squared end 45 on the said rod. One side of the handle rests against an end of the gland 31. By turning the handle 44 and the rod 40 to the right, it will be observed that the high part of the cam 42 is brought into engagement with the valve 3 and causes the closing of the same. When, however, the parts are turned in the opposite direction, the low part of the cam 42 is brought opposite the valve to permit the pressure of the water against the valve to cause the opening of the same.

It will be understood that the operating face of the cam 42 should be of a curvature such that when it is turned so as to close the valve 3 pressure of the water against the valve will not cause the turning or moving of the cam to permit the opening of the said valve.

Having thus described my invention, I claim:—

In a device of the character described, the combination of a casing having a port therein to permit the issuing of a fluid such as water thereinto, and the said casing having a projection formed upon the interior thereof at a point in front of the said port, a valve for closing the said port, a rod extending into the said casing and having a cam thereon for controlling the position of the said valve, the inner end of the said rod resting against one side of the said projection and being held in proper position thereby, and the other end of the said rod projecting from the said casing, and a hand lever having connection with the said projecting end for actuating the said rod to control the said valve.

In testimony that I claim the foregoing as my invention, I have hereunto signed my name this 25th day of January, A. D. 1911.

WILLIAM U. GRIFFITHS.

In the presence of—
GEO. H. WEIDNER,
CARRIE E. KLEINFELDER.

Copies of this patent may be obtained for five cents each, by addressing the "Commissioner of Patents, Washington, D. C."